United States Patent [19]

Waagen et al.

[11] Patent Number: 5,004,778
[45] Date of Patent: Apr. 2, 1991

[54] PROCESS FOR THE PREPARATION OF ULTRASTRETCHABLE POLYMER MATERIAL, ULTRASTRETCHABLE MATERIAL, AS WELL AS A PROCESS FOR THE MANUFACTURE OF OBJECTS

[75] Inventors: Geert N. Waagen, Baarn; Cornelis W. M. Bastiaansen, Dongen; Robert Kirschbaum, Sittard, all of Netherlands

[73] Assignee: Stamicarbon B.V., Geleen, Netherlands

[21] Appl. No.: 197,361

[22] Filed: May 23, 1988

[30] Foreign Application Priority Data

May 22, 1987 [NL] Netherlands ............... 8701219

[51] Int. Cl.$^5$ ............... C08L 23/04; C08K 5/01
[52] U.S. Cl. ............... 524/474; 524/487; 524/570; 524/585; 264/126; 264/119
[58] Field of Search ............... 524/474, 487, 585, 570; 264/119, 126

[56] References Cited

U.S. PATENT DOCUMENTS

| | | | |
|---|---|---|---|
| 3,665,068 | 5/1972 | Duling et al. | 264/211 |
| 4,161,502 | 7/1979 | Wessling et al. | 264/119 |
| 4,323,531 | 4/1982 | Bradley et al. | 264/113 |
| 4,348,350 | 9/1982 | Meier et al. | 264/570 |

FOREIGN PATENT DOCUMENTS 0143863 6/1985 European Pat. Off. .
0159110 10/1985 European Pat. Off. .
0215507 3/1987 European Pat. Off. .

OTHER PUBLICATIONS

Polymer Communications, 26:258-259 (1985) (Smith et al).
Polymer Communications, Drawing of Virgin Ultrahigh Molecular Weight Polyethylene: An Alternative Route to High Strength Fibres; Paul Smith, Henri D. Chanzy and Bruno P. Rotziner, E. I. Du Pont de Nemours and Company, Inc., Central Research and Development Department, Experimental Station, Wilmington, Del. 19898, U.S.A. (Received Apr. 16, 1985); vol. 20, No. 9, Sep., 1985.
Makromil. Chem. 180, 2983-2986, (1979) "Ultrahigh-Strength Polyethylene Filaments by Solution Spinning/-Drawing, 2a, Influence of Solvent on the Drawability" by Paul Smith.

Primary Examiner—C. Warren Ivy
Attorney, Agent, or Firm—Cushman, Darby & Cushman

[57] ABSTRACT

An ultrastretchable polymer material is prepared starting from polyolefine particles with a low entanglement density and a weight average molecular weight ($M_w$) higher than 400,000, the particles being densified to a coherent material together with a process auxiliary material at an elevated temperature, but below the melting point of the pure polyolefine.

From this ultrastretchable material, objects with a high tensile strength and a high modulus can be produced by stretching it, for instance, at a temperature which is at most 70° C. below the temperature at which the polyolefine melts under the prevailing conditions, if desired after removal of the process auxiliary agent present in it.

14 Claims, No Drawings

PROCESS FOR THE PREPARATION OF ULTRASTRETCHABLE POLYMER MATERIAL, ULTRASTRETCHABLE MATERIAL, AS WELL AS A PROCESS FOR THE MANUFACTURE OF OBJECTS

The invention relates to a process for the preparation of an ultrastretchable material starting from polyolefine particles with a low entanglement density and a weight average molecular weight $M_w$ higher than 400,000.

By ultrastretchable material is understood here a material which below its melting point can be stretched at least ten times without having been preoriented, for instance through stretching in the melt phase.

The invention laid down in Dutch patent application No. 7900990 has made possible commercial-scale spinning of high-molecular polymers and to stretch the resulting filaments at a temperature not far below the melting point. This gives very strong filaments, with a tensile strength of 2-3 GPa for instance, in which the molecules are only slightly entangled.

Since these filaments are obtained starting from solutions, the polymer molecules were most probably highly entangled initially. A number of polymers, such as polypropylene and polyethylene, can be formed as particles during the polymerization process, in which particles—depending on the polymerization circumstances—the long molecules have not had much chance yet to become entangled with each other. It would be useful if such polymer particles could be turned into strong materials through stretching without prior entangling.

It has been attempted—see, for instance, Polymer Journal 15, (1983), pp. 327 ff—to achieve this by pressing through a small opening high-molecular, monocrystal polyethylene particles with a low entanglement density in the solid phase. This indeed yielded an ultrastretchable strip. The poor processing characteristics in the solid phase, entailing high processing costs, make large-scale application of the powder highly problematic, however.

It is also known—see NL-A-8.502.298—to first irradiate polyethylene particles with a low entanglement density - resulting in crosslinking, which prevents entanglement - then to make a formed object of them, above the melting point and with or without a process auxiliary agent and subsequently to effect stretching below the melting point. This indeed gives an object with a tensile strength of 1.8 GPa. A drawback is, however, that it is not technologically easy to irradiate a pulverulent polymer evenly.

The object of the invention is to provide a process by which polymer particles with a low entanglement density can be processed in such a way that this density is not, or not significantly, increased. More in particular, the aim of the present invention is to provide a process by means of which an ultrastretchable material can be obtained more easily from said particles. The invention is also aimed at manufacture of objects of great strength from these ultrastretchable materials. Other advantages will be mentioned in the following.

The process according to the invention for preparation of an ultrastretchable material starting from polyolefine particles with a low entanglement density and a weight average molecular weight ($M_w$) of more than 400,000 is characterized in that the particles, at a temperature below the melting point of the pure polymer and less than 30° C. below the dissolution temperature for a mixture consisting of the quantities of polymer and process auxiliary agent being used, are compressed to a coherent material together with a process auxiliary agent.

By polyolefine particles are understood here particulate polymers of alkenes such as ethylene and propylene, at least 90% of which is made up of one monomer, in particular polyethylene prepared with a coordination catalyst in the gas phase or in suspension, with 0-5, preferably 0-2 mol. % higher alkenes with 3-10 carbon atoms, for instance propylene, butylene, hexylene or octylene.

By $M_w$ is understood the weight average molecular weight, which, like the number average molecular weight, $M_n$, has been determined by means of gel permeation chromatography. Preferably, a polyethylene is used with an $M_w$ between 500,000 and 10,000,000. Better materials are obtained if the molecular weight distribution is relatively narrow, preferable such that the $M_w/M_n$ ratio is less than preferably less than 5.

For the preparation of polymer particles with a low entanglement density, see for instance "Ziegler-Natta Catalysts and Polymerization", by J. Boor, Academic Press Inc., p. 202. The entanglement density can be derived from, for instance, the melt enthalpy of the particles or the difference between this enthalpy and that which is found when they have been fully melted and solidified again. This difference should be at least 10%, preferably more than 20% of the original melt enthalphy.

As process auxiliary agent, many substances can be used, for instance aliphatic hydrocarbons, paraffin oil or paraffin wax, aromatic hydrocarbons, such as xylene or hydrogenated aromatics, such as decaline or tetraline. To a certain extent, the effect of these process auxiliary agents can be compared with that of tackifiers in the rubber industry.

Various substances having a useful function when present in the polymer may be added to the process auxiliary agent.

The quantity of process auxiliary agent may be varied between wide limits. In general, at least 1 wt. % relative to the polymer will be used, with a maximum of 100 wt. %. Preferably, between 5 and 35 wt. % will be used if it is intended to remove the process auxiliary agent later. If this is not the case, smaller quantities will be used, for instance between 1 and 5 wt. %, depending on the use of the objects to be made and the nature of the process auxiliary agent.

Besides process auxiliary agents, reinforcing materials such as glass, carbon, aramide, polyethylene fibre and other aggregates may be added to the powder.

For the compression, a pressure of 20-500 bar is sufficient in most cases. Higher or lower pressures, for instance 10 or 1000 bar, are also possible, however.

The temperature during the compression will be below the melting point of the pure polymer, preferably less than 30° C. below the dissolution temperature for a mixture consisting of the quantities of polymer and process auxiliary being used. This temperature can be calculated on the basis of the Flory-Huggins relation for the melting point depression. The interaction parameter used in this relation should be calculated previously. For decaline, it is found to be about 0.2. (See D.J.Flory: "Principles of Polymer Chemistry", Cornell Univ. Press, p.569). The melting point of the polyolefine is determined by the Differential Scanning Calorimetry method at 5° C./min.

An explanation for the present invention is hard to give. It is possible that the slightly entangled polymer in said particles in themselves allow ultrastretching at a temperature around the melting point. However, this leaves the problem that these molecules are not easily so manipulated that the process of ultrastretching gets started. Addition of the process auxiliary agent may initiate movement of the polymer molecules at the surface. These molecules might then become entangled with each other and with the molecules located a little deeper, in part through the effect of the compression. Thus, all molecules in the resulting mass would be so interconnected that the mass is ultrastretchable.

After compression, the process liquid may be removed fully or in part through extraction or evaporation. In some cases, all of it may remain in the polyolefine.

The ultrastretchable mass obtained may be subjected to ultrastretching without cooling it down to room temperature first. Often it will be cooled to below 90° C. Ultrastretching is preferably effected at an elevated temperature, not lower than 70° C. below the temperature at which the polymer begins to melt or dissolve under the actual conditions. In the case of a high-molecular polyethylene with an $M_w$ higher than 500,000, the temperature at which ultrastretching can be effected will usually be at least 90° C. The maximum temperature for ultrastretching is determined by the melting point of the polymer under the prevailing conditions, which—as is known—also depends on the tension to which the polymer is subjected. The stretching treatment may be carried out in more than one step, preferably at increasing temperatures.

The fact that there should be no or only little melting during the ultrastretching does not mean that previously, when the ultrastretchable mass is processed, no melting is allowed to occur, provided it is of such short duration and takes place under such circumstances that only little entanglement occurs. Thus, tablets, strands or pellets of the ultrastretchable material may be rapidly passed through a heated opening, after which the object obtained in the form of a filament, strip, rod or sheet is subjected to stretching. If the melting has been very brief or very partial and, in particular, if the fully or partially melted object is rapidly stretched in that condition, objects can be obtained with attractive mechanical properties which are clearly better than those resulting from melt processing of lower molecular polymer. The same applies if the ultrastretchable material is processed at a temperature higher than the melting point, for instance by injection moulding.

The products according to the invention are suitable for many applications.

Filaments and bands, for instance, can be used for reinforcement in many kinds of material which are known to lend themselves to reinforcement with fibres or filaments, and for all applications for which low weight combined with high strength is desired, such as rope, nets, filter cloths, fabrics, magnetic tapes.

The films according to the invention, whether or not biaxially stretched, are suitable for many applications. They may be cut to strong strips, bands, tapes. They can be used as reinforcement in many kinds of material which are known to lend themselves to reinforcement with films or bands, and for all applications for which low weight combined with high strength is required, such as for audiovisual or magnetic tapes, tapes for medical applications, packaging films, cover films, carrier films for adhesives, insulating films in condensers, etc.

If desired, minor quantities of the usual additives, stabilizing agents, fibre treatment agents and the like may be included in or on the objects, in particular in quantities of 0.1-10 wt. % relative to the polyethylene.

The invention will be further elucidated in the following examples, without being restricted thereto, however.

EXAMPLE 1

A polyethylene powder with an $M_w$ of 4,000,000 g.mol−1, an Mn of 1,000,000 g.mol−1 and a melting heat of 230 J/g (measured on a DSC-7 with a heating-up rate of 5° C./min) was intensively mixed with 17 wt. % decaline (relative to the polyethylene) for 17 minutes at room temperature in a Henschel mixer.

Next, 5 g of the mixture was pressed for 10 minutes at 135° C. in a flat-plate press with a force of 20 tonnes, thus forming a 0.5 mm thick sheet. The decaline present was removed through evaporation in about 30 minutes in a vacuum stove at 23° C. and 50 mbar.

EXAMPLE 2

Dumbbell-shaped test bars taken from the sheet obtained in example 1 were isothermally stretched 40 times at 120° C. on a drawing bench with a clamp speed of 10 mm per minute.

The E-modulus and the tensile strength at room temperature and a drawing rate of 0.01 s−1 amounted to 70 GPa and 1.8 GPa, respectively.

EXAMPLE 3

Dumbbell-shaped test bars taken from the sheet obtained in example 1 were together stretched 53 times in a three-step process at 120, 130 and 140° C. The E-modulus and the tensile strength at room temperature and a drawing rate of 0.01 s−1 amounted to 92 GPa and 2.3 GPa, respectively.

EXAMPLE 4

Example 1 was repeated at a compression temperature of 130° C. The stretching ratio at 120° C. was 42 times and the E-modulus and the tensile strength at room temperature and a drawing rate of 0.01 s−1 were 72 GPa and 2.0 GPa, respectively.

COMPARATIVE EXAMPLE 1

Examples 1 and 2 were repeated, but without decaline. The sheet obtained was too brittle to punch dumbbell-shaped bars from it.

COMPARATIVE EXAMPLE 2

The powder used in example 1 was spread out on a Mylar film and heated for 30 minutes at 180° C. in an oven under nitrogen. The melt enthalpy of this treated powder, measured on a DSC-7 with a scanning rate of 5° C./min., was 145.3 J/g. After addition of 17% decaline the treated powder was compressed using the procedure described in example 4 (compression temperature 130° C.). The sheet thus obtained was brittle and the grain boundaries were still detectable in it. With careful treatment, a maximum stretching degree of 5x appeared to be achievable. The E-modulus and the tensile strength measured at room temperature and a drawing rate of 0.01 s−1 were 8 GPa and 0.2 GPa, respectively.

What is claimed is:

1. Process for the preparation of ultrastretchable polymer material starting from ethylene polymer particles with a low entanglement density and an average molecular weight (MW) higher than 400,000, wherein a mixture of the ethylene polymer particles and a process auxiliary agent, is compressed to a coherent material at a temperature below the melting point of the pure polymer and less than 30° C. below the dissolution temperature for a mixture consisting of the quantities of polymer and process auxiliary agent being used and wherein said dissolution temperature is below the melting point of the pure polymer and wherein the process auxiliary agent and the ratio of the process auxiliary agent to polymer are chosen to provide an ultrastretchable polymer material.

2. Process according to claim 1, characterized in that 1-100 wt. % process auxiliary agent relative to the ethylene polymer is used.

3. Process according to claim 1, characterized in that the ethylene polymer used is an ethylene polymer with at least 95 mol. % ethylene prepared with a coordination catalyst.

4. Process according to claim 3, characterized in that the ethylene polymer has an $M_w$ between 500,000 and 10,000,000.

5. Process according to claim 3, characterized in that the ratio $M_w/M_n$ is less than 5.

6. Process according to claim 1, wherein a melt enthalpy of the ethylene polymer particles is at least 10% higher than a melt enthalpy of the ethylene polymer particles after melting and solidifying the ethylene polymer particles.

7. Process according to claim 1, characterized in that the process auxiliary agent is xylene, decaline, paraffin oil or paraffin wax.

8. Process according to claim 1, characterized in that the densification temperature is less than 30 below the Flory-Huggins solution temperature.

9. Ultrastretchable material prepared in accordance with claim 1.

10. Process for the manufacture of objects with a high tensile strength and a high modulus, characterized in, that ultrastretchable material according to claim 1, is stretched at a temperature which is at most 70° C. below the temperature at which the the pure polymer particles melts.

11. Process according to claim 10, characterized in that polyethylene is stretched at a temperature higher than 120° C.

12. Process according to claim 11, characterized in that the ultrastretchable material is at least partly melted and extruded, the at least partly melted extrudate being extruded both before and after complete solidification.

13. Object manufactured by the process according to claim 10.

14. Process according to claim 1 wherein the process auxiliary agent is an aliphatic hydrocarbon, paraffin oil or paraffin wax, an aromatic hydrocarbon, or a hydrogenated aromatic.

* * * * *